United States Patent
Lee

(10) Patent No.: US 10,080,108 B2
(45) Date of Patent: Sep. 18, 2018

(54) ELECTRONIC DEVICE AND METHOD FOR UPDATING POINT OF INTEREST

(71) Applicant: Samsung Electronics Co., Ltd, Gyeonggi-do (KR)

(72) Inventor: Jae Hwan Lee, Incheon (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/415,827

(22) Filed: Jan. 25, 2017

(65) Prior Publication Data

US 2017/0215042 A1    Jul. 27, 2017

(51) Int. Cl.
*H04W 24/00* (2009.01)
*H04W 4/04* (2009.01)
*H04M 3/42* (2006.01)
*H04L 29/06* (2006.01)

(52) U.S. Cl.
CPC .................................. *H04W 4/04* (2013.01)

(58) Field of Classification Search
CPC ........... H04W 4/04; H04W 4/00; H04W 4/02; H04W 8/08; H04W 48/04; H04W 64/00; H04L 29/08108; H04L 29/08657; H04L 29/08936; H04M 1/72572
USPC ....................................................... 455/456.3
See application file for complete search history.

(56) References Cited

U.S. PATENT DOCUMENTS

2011/0270517 A1* 11/2011 Benedetti ............... G01C 21/20
                                                          701/533
2013/0290433 A1    10/2013 Park

* cited by examiner

*Primary Examiner* — Huy C Ho

(57) ABSTRACT

An electronic device includes a memory, which stores one or more pieces of schedule information of a user corresponding to the electronic device, and a processor. The processor is configured to obtain location information corresponding to the electronic device, to select at least one schedule information, which is associated with a location corresponding to the location information, from among the one or more pieces of schedule information, to determine whether an event corresponding to the location occurs, based at least on the at least one schedule information, and to set the location to a POI corresponding to the user based at least on the occurrence of the event.

20 Claims, 12 Drawing Sheets

ELECTRONIC DEVICE AND METHOD FOR UPDATING POINT OF INTEREST

CROSS-REFERENCE TO RELATED APPLICATION(S) AND CLAIM OF PRIORITY

The present application is related to and claims the benefit under 35 U.S.C. § 119(a) of a Korean patent application filed on Jan. 25, 2016 in the Korean Intellectual Property Office and assigned Serial number 10-2016-0008566, the entire disclosure of which is hereby incorporated by reference.

TECHNICAL FIELD

The present disclosure relates to a technology that automatically builds a POI database.

BACKGROUND

With the development of electronic technologies, various types of electronic products are being developed and distributed. In particular, an electronic device, which has a variety of functions, such as a smartphone, a tablet PC, or the like is being widely supplied nowadays.

The electronic device may execute a map application that displays a location of the electronic device and searches for a location of a desired place. The user may search for a place included in a point of interest (POI) database by using the map application.

A conventional electronic device may search for or display only a place included in the POI database provided by a map service provider. In addition, for this reason, it is troublesome for the user to directly enter location information and a name corresponding to a location, to update the POI database.

SUMMARY

To address the above-discussed deficiencies, it is a primary object to provide an electronic device and a method that automatically collects POI information, selects information, which has high reliability, from among the collected POI information, and updates the POI database.

In accordance with an aspect of the present disclosure, an electronic device includes a memory, which stores one or more pieces of schedule information of a user corresponding to the electronic device, and a processor. The processor is configured to obtain location information corresponding to the electronic device, to select at least one schedule information, which is associated with a location corresponding to the location information, from among the one or more pieces of schedule information, to determine whether an event corresponding to the location occurs, based at least on the at least one schedule information, and to set the location to a POI corresponding to the user based at least on the occurrence of the event.

In accordance with an aspect of the present disclosure, an electronic device includes a memory in which user data is stored and a processor electrically connected with the memory. The processor is configured to obtain schedule information, which comprises a location name and a time, from the user data stored in the memory, and to store POI information, which comprises the location name and location information of the electronic device, in the memory if an event corresponding to the schedule information occurs.

In accordance with an aspect of the present disclosure, an electronic device includes a memory in which map information and schedule information of a user are stored, an acceleration sensor that senses movement of the electronic device, a communication circuit that collects location information of the electronic device, and a processor electrically connected with the memory, the acceleration sensor, and the communication circuit. The processor is configured to compare location information of the electronic device, which is obtained through the acceleration sensor or the communication circuit, with the schedule information, to generate POI information by mapping the location information to a location name that is set in the schedule information, and to provide the POI information associated with the location information when the map information is provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
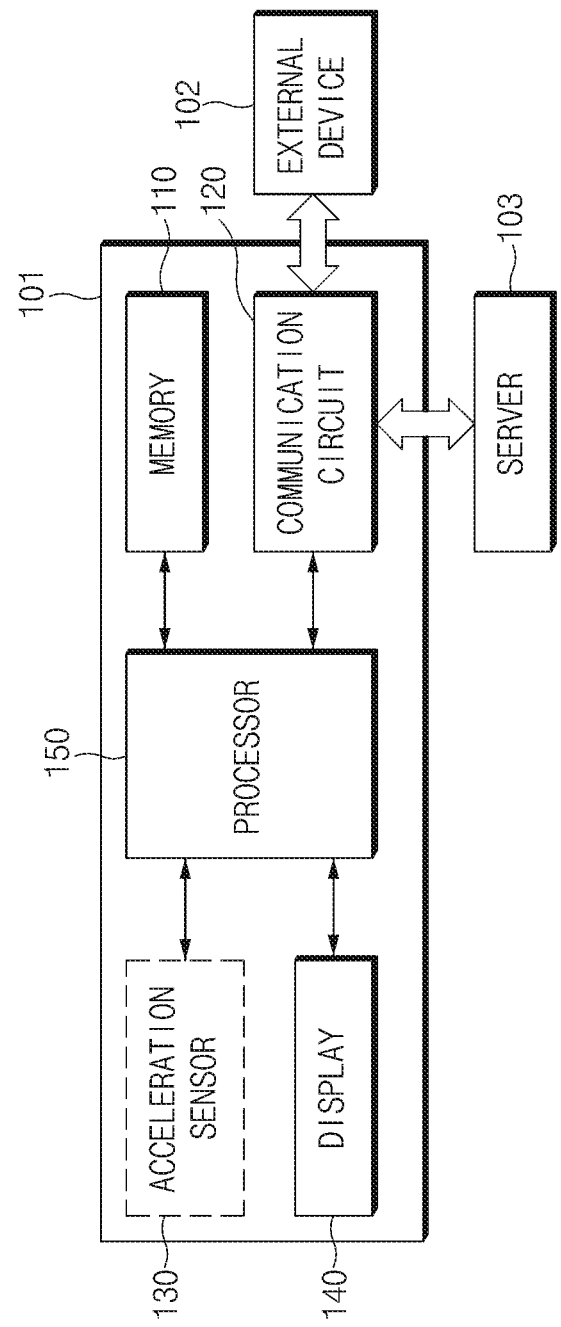
FIG. 1 illustrates a configuration of an electronic device according to an embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Various embodiments of the present invention may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, a first user device and a second user device indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

According to various embodiments of the present disclosure, an electronic device may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the electronic device may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. According to an embodiment, an electronic device may be a flexible electronic device. Furthermore, according to an embodiment of the present disclosure, an electronic device may not be limited to the above-described electronic devices and may include other electronic devices and new electronic devices according to the development of technologies.

Hereinafter, according to various embodiments, electronic devices will be described with reference to the accompanying drawings. The term "user" used herein may refer to a person who uses an electronic device or may refer to a device (e.g., an artificial intelligence electronic device) that uses an electronic device.

FIG. 1 illustrates a configuration of an electronic device, according to an embodiment of the present disclosure.

Referring to FIG. 1, an electronic device 101 may include a memory 110, a communication circuit 120, an acceleration sensor 130, a display 140, and a processor 150.

The electronic device 101 may collect and analyze data input while a user employs an application, such as a calendar, a short message service (SMS), a messenger, an e-mail, or the like. The electronic device 101 may obtain schedule information by analyzing the data. The electronic device 101 may compare an event, which is generated by the electronic device 101, with the schedule information and may store POI information about the schedule information with high reliability based on the compared result. In the disclosure disclosed herein, it is understood that the POI includes a region of interest (ROI). The electronic device 101 may build the personalized POI database by storing the POI information.

The memory 110 may store various pieces of data and information. The memory 110 may include a volatile memory and/or a nonvolatile memory. The memory 110 may store user data and map information. In the disclosure disclosed herein, the user data may be data, which is generated while the user employs the electronic device 101, and may include, for example, data such as a text, which the user inputs, a text received from the outside, or the like. The memory 110 may store the schedule information of the user of the electronic device 101. In the disclosure disclosed herein, the schedule information may be data obtained by analyzing the user data, and may include information about, for example, an appointment place and an appointment time. The memory 110 may store the POI information. The POI information stored in the memory 110 may constitute the POI database.

The communication circuit 120 may communicate with another device. The communication circuit 120 may communicate with, for example, a server 103 storing the POI database or an external device 102 in which the user data is stored. The communication circuit 120 may include at least one or more of a cellular interface, a wireless-fidelity (Wi-Fi) interface, a Bluetooth interface, or a global navigation satellite system (GNSS) interface. Location information of the electronic device 101 may be obtained by one or more of the above-mentioned modules.

The acceleration sensor 130 may sense the movement of the electronic device 101 or acceleration that acts on the electronic device 101.

The display 140 may output map information. The display 140 may output the POI information together with the map information. The display 140 may output a user interface for determining storage or transmission of the POI information.

The processor 150 may be electrically connected with the memory 110, the communication circuit 120, the acceleration sensor 130, and the display 140. The processor 150 may control the memory 110, the communication circuit 120, the acceleration sensor 130, and the display 140.

According to an embodiment, the processor 150 may obtain the schedule information including a location name and a time from the user data stored in the memory 110. The processor 150 may obtain at least a portion of the schedule information from the external device 102. The processor 150 may periodically obtain the schedule information from the user data or may obtain the schedule information from the user data whenever a specified condition is satisfied. The processor 150 may obtain the schedule information from the user data, for example, a short message, a multimedia message, an instant message, a calendar schedule list, a local/online scheduler, an e-mail, application data, or the like which is stored in the memory 110 or the external device 102. The processor 150 may obtain the schedule information including the location name and a time by analyzing the text included in the user data. The processor 150 may extract a text including the location and the time associated with the schedule of the user from the text by using, for example, a keyword extraction algorithm. The processor 150 may store the schedule information in the memory 110.

According to an embodiment, the processor 150 may sense occurrence of the event corresponding to the schedule information. For example, the processor 150 may compare location information of the electronic device 101 with the schedule information. The location information may be obtained through the acceleration sensor 130 and/or the communication circuit 120. The location information may include, for example, an acceleration value and/or a coordinate value. The processor 150 may determine whether the acceleration value and/or the coordinate value corresponds to the location name included in the schedule information.

As another example, the processor 150 may sense the event corresponding to the location name at the time corresponding to the schedule information. The processor 150 may verify a time included in the schedule information. If the time included in the schedule information comes, the processor 150 may sense the occurrence of the event. The processor 150 may determine the event, which is mapped to the location name in a prestored table, as the event corresponding to the schedule information. The processor 150 may sense the event based on the magnitude of the acceleration sensed by using the acceleration sensor 130. For example, if the acceleration of a specified range is sensed at the time corresponding to the schedule information, the processor 150 may determine that the event corresponding to the schedule information occurs. The event may be identified as, for example, staying, walking, running, driving, or the like based on the speed or the acceleration of the electronic device 101.

As another example, the processor 150 may determine whether the event occurs, based on a function executed at a time corresponding to the schedule information by the electronic device 101. The processor 150 may obtain context information including information about at least one of the location of the electronic device 101, the movement of the electronic device 101, or a time. The processor 150 may obtain information about the location of the electronic device 101 by using the communication circuit 120 and may obtain information about the movement of the electronic device 101 by using the communication circuit 120 or the acceleration sensor 130. The processor 150 may obtain information about a current time through a clock application, a clock generator, or the like. The processor 150 may determine whether the event occurs, based on the obtained information. If the obtained information satisfies a specified condition, the processor 150 may determine that the event occurs. For example, in the case where there is no movement of the electronic device 101 at a specified time, the processor 150 may determine that the event occurs.

For example, the processor 150 may obtain the schedule information, which includes a location name "school" and a time "10:00 AM," from a local message (e.g., a text message or schedule information of a local calendar) including a text indicating "school at 10:00 AM." The local message may be a message stored in the memory 110. The event corresponding to the location "school" may be in a staying state. In the case where the electronic device 101 stays at a specific location at 10:00 AM, the processor 150 may determine that the event occurs.

As another example, the processor 150 may obtain the schedule information, which includes a location name "Han river" and a time "7:00 PM," from an online message (e.g., an e-mail, a social network service (SNS) message, or schedule information of an online calendar) including a text indicating "exercise in Han river at 7:00 PM." The online message may be a message stored in the external device 102. The event corresponding to the location "Han river" may be walking. In the case where the electronic device 101 moves at about 4 km/h at 7:00 PM, the processor 150 may determine that the event occurs.

According to an embodiment, if the event corresponding to the schedule information occurs, the processor 150 may store the POI information, which includes the location name and location information of the electronic device 101, in the memory 110. The processor 150 may set a location associated with the event to the POI based on occurrence of the event. The processor 150 may change at least a portion of the POI information, which is stored in the memory 110, based on context information. The processor 150 may obtain the location information (e.g., coordinates or an address) by using at least one or more of a cellular interface, a WI-FI interface, a Bluetooth interface, or a GNSS interface that is included in the communication circuit 120. The processor 150 may generate the POI information by mapping the location name, which is set in the schedule information, to the location information. The processor 150 may store the generated POI information in the memory 110. The personalized POI database may be automatically built by generating and storing the POI information based on the analyzed user data generated when the user uses an application. In addition, reliability of the POI database may be improved by storing the POI information only if a specified event occurs.

According to an embodiment, if a message indicating arrival is sent or received at a time included in the schedule information, the processor 150 may store the POI information. For example, in the case where the time included in the schedule information is "7:00 PM," the processor 150 may analyze a message that is sent or received by using a messenger or an SMS for 10 minutes before and after 7:00 PM. In the case where a word indicating the arrival, for example, "arrive," "come," "go" or "get off," or the like is included in the message, the processor 150 may store the POI information corresponding to the corresponding schedule information.

According to an embodiment, the processor 150 may recognize a voice sent or received during an outgoing or incoming call at the time included in the schedule information. If a voice indicating the arrival is included in the sent or received voice, the processor 150 may store the POI information. For example, in the case where the time included in the schedule information is "7:00 PM," the processor 150 may recognize the voice that is sent or received during the outgoing or incoming call for 10 minutes before and after 7:00 PM. In the case where a word indicating the arrival, for example, "arrive," "come," "go" or "get off," or the like is included in the voice, the processor 150 may store the POI information corresponding to the corresponding schedule information. As described above, the reliability of the POI database may be improved by determining whether to store the POI information, based on the message or the voice that is sent or received at the time included in the schedule information.

According to an embodiment, the processor 150 may send the POI information to the server 103 by using the communication circuit 120. If the POI information is generated, the processor 150 may send the POI information to the server 103 storing the POI database. The processor 150 may send the POI information to the server 103 by using the cellular interface or the WI-FI interface included in, for example, the communication circuit 120.

According to an embodiment, the processor 150 may select a portion of the POI information and may send the selected portion to the server 103. If the POI information satisfies a specified condition, the processor 150 may send the POI information to the server 103. For example, if the POI information is common information that is suitable to be shared through the server 103, the processor 150 may send the POI information to the server 103. For example, the common information may include the POI information extracted from the user data (e.g., reservation information) including information about a reservation. As another example, the common information may be information other than the POI information, which is determined as being associated with privacy of the user, for example, "home," "workplace," or the like, from among pieces of POI information stored in the electronic device 101. As another example, the common information may be information other than the POI information, which is defined by the user, from among the pieces of POI information stored in the electronic device 101. As described above, personal information may be prevented from being leaked and the POI database that a plurality of users are capable of sharing may be built by sharing only the common information, which satisfies the specified condition, from among the pieces of POI information in the server 103.

According to an embodiment, when map information is provided, the processor 150 may provide the POI information associated with location information. The processor 150 may provide the user with map information by executing a map application. When the map information is provided, the processor 150 may display a name included in the POI information at a location included in the POI information. For example, in the case where a location name "workplace" and location information "343 Gangnam-daero, Seocho-go, Seoul" are included in the POI information, when displaying a map, the processor 150 may display a text "workplace" on the location corresponding to "343 Gangnam-daero, Seocho-go, Seoul." If the user searches for a place while map information is provided, the processor 150 may provide the POI information corresponding to a search term. For example, in the case where the user enters a search term "workplace", the processor 150 may provide location information "343 Gangnam-daero, Seocho-go, Seoul" as the found result. An exemplary embodiment that provides the POI information will be described with reference to FIG. 9 in detail.

The external device 102 may be a device in which the user data is stored. The external device 102 may be a server that provides a service, for example, an e-mail, a mobile messenger, an SNS, an SMS, a calendar service, a cloud service, or the like, for extracting the user data.

The server 103 may store the POI database. The server 103 may receive the POI information from the electronic device 101, may build the POI database by using the received POI information, and may provide the POI database to the electronic device 101.

Figure 2:
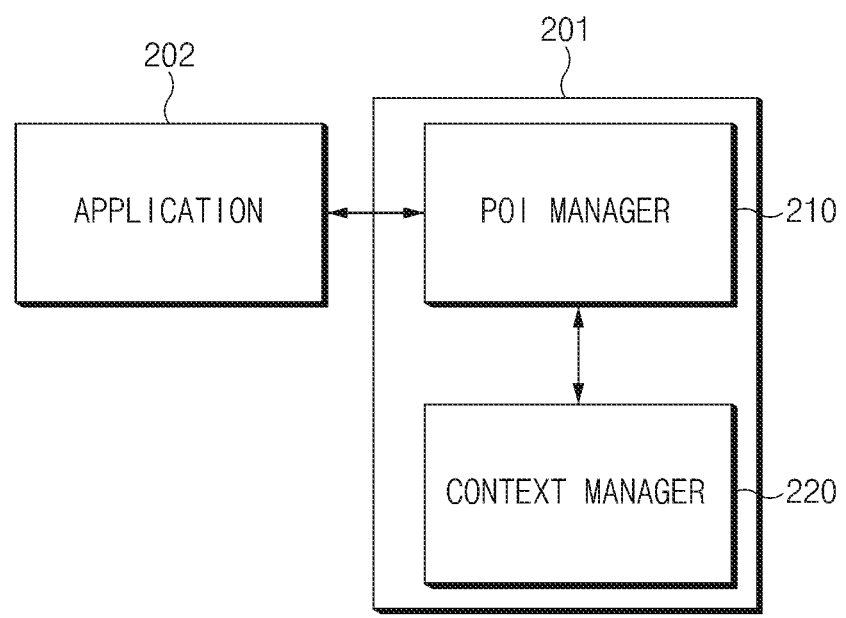
FIG. 2 illustrates a program module that is stored in an electronic device according to an embodiment of the present disclosure.

FIG. 2 illustrates a program module that is stored in an electronic device, according to an embodiment of the present disclosure.

Referring to FIG. 2, a program module 201 may include a POI manager 210 and a context manager 220.

The POI manager 210 may extract user data to build personalized POI. The POI manager 210 may build a POI database by combining the user data with location information.

The POI manager 210 may extract the user data included in an application 202 for an SMS, an MMS, an e-mail, a calendar, or the like and may extract schedule information including a location name, a time, an action at a corresponding location, or the like from the user data.

The location may include a location, which the public know, such as a movie theater, a shopping mall, a department store, an art museum, a subway station, or the like and a location, which is defined by a user of an electronic device, such as a home, a workplace, a meeting venue with an acquaintance, or the like.

The context manager 220 may determine reliability of the schedule information. The context manager 220 may use location information or acceleration information of the electronic device that is periodically or randomly obtained around a time corresponding to the schedule information. The context manager 220 may determine an action (or an event) of the user, which is expected at a location corresponding to the schedule information, to build the personalized POI database. The context manager 220 may determine whether location information or acceleration information coincides with the determined action. For example, in the case where the electronic device is present in a specified location range for a specified time range or more, the context manager 220 may determine that the user of the electronic device stays at a corresponding location to execute a specified action. On the other hand, in the case where the electronic device is not present within the specified location range, the context manager 220 may determine that the user of the electronic device does not execute an action based on context of the schedule information.

The context manager 220 may obtain location information by using a satellite navigation system, such as a GPS, a Glonass, or the like, or a communication means, such as Bluetooth (BT), wireless fidelity (Wi-Fi), Bluetooth low energy (BLE), 3G or 4G, or the like. The operating of above-described sensor or the communication means to obtain the location information may cause the current consumption. Accordingly, the context manager 220 may obtain the location information only within a time period corresponding to the schedule information (e.g., for 10 minutes before and after a time included in the schedule information), thereby minimizing the current consumption.

For example, in the case where a location corresponding to the schedule information is a movie theater, the context manager 220 may determine that the user of the electronic device maintains a static action pattern. The context manager 220 may sense acceleration, which acts on the electronic device, by using an acceleration sensor. In the case where magnitude of the acceleration is smaller than or equal to a specified magnitude, the context manager 220 may determine that the user executes a specified action. In this case, the context manager 220 may instruct the POI manager 210 to generate POI information.

The POI manager 210 may generate the POI information, which includes a location name and location information included in the schedule information, based on instructions of the context manager 220. The POI manager 210 may build the personalized POI database by storing the POI information.

The POI manager 210 may send the POI information to a server, and the sent POI information may be combined with the POI information that is generated by another electronic device. According to an embodiment, the POI manager 210 may send information other than POI information, which is defined by the user of the electronic device, of the generated POI information. Since the POI information defined by the user becomes personal privacy information, the POI information may not be suitable to share with another user. Accordingly, the POI manager 210 may filter the POI information, which is necessary to protect privacy, of the POI information. According to an embodiment, the POI manager 210 may change a filter level for privacy protection based on user settings.

The POI manager 210 may receive the POI information, which is updated by another user, from a server. The POI manager 210 may store the received POI information.

The above-mentioned program module 201 may be stored in the memory 110 of FIG. 1 and may be performed by the processor 150 of FIG. 1.

Figure 3:
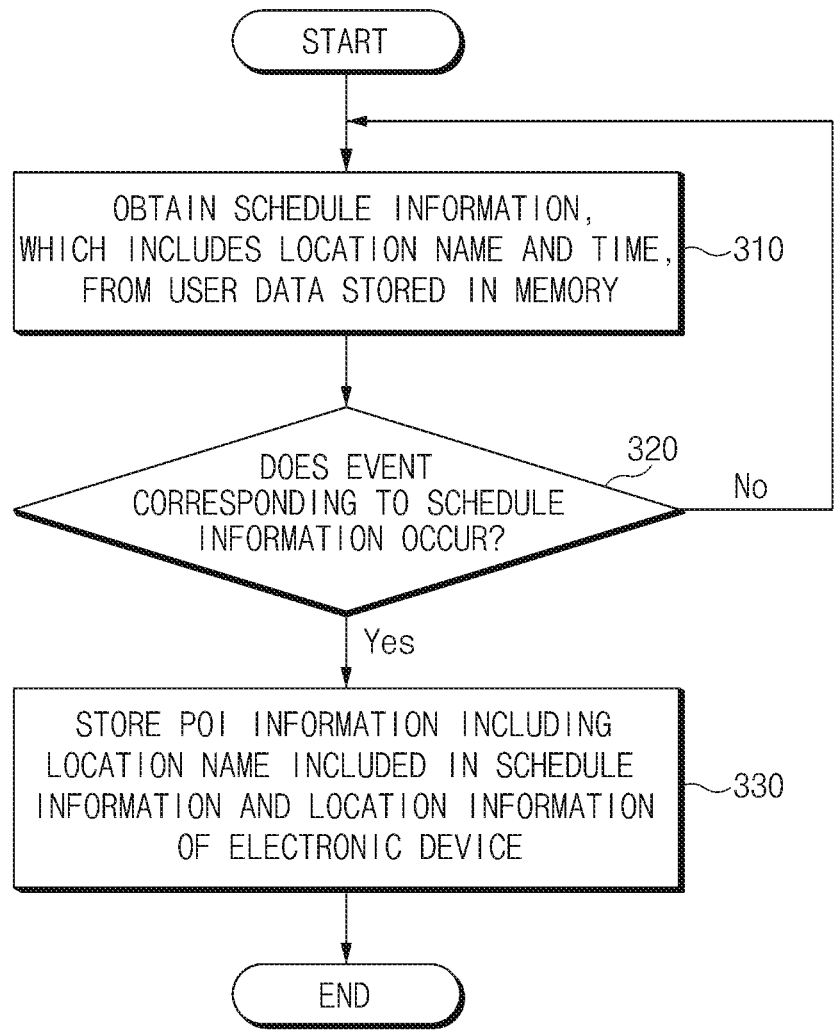
FIG. 3 illustrates a flowchart for describing a POI information updating method of an electronic device according to an embodiment of the present disclosure.

FIG. 3 illustrates a flowchart for describing a POI information updating method of an electronic device according to an embodiment of the present disclosure.

The flowchart illustrated in FIG. 3 may include operations which the electronic device 101 illustrated in FIG. 1 processes. Even though omitted below, the above description about the electronic device 101 given with reference to FIG. 1 may be applied to the method illustrated in FIG. 3.

Referring to FIG. 3, in operation 310, the electronic device 101 (e.g., the processor 150) may obtain schedule information, which includes a location name and a time, from user data stored in a memory. For example, the electronic device 101 may obtain the schedule information, which includes the location name "301-dong" and the time "10:00 AM" from a text message including a text indicating "time: 10:00 AM, place: 301-dong 201-ho." Hereinafter, "301-dong" may be another name indicating "the first engineering building, Seoul National University." According to an embodiment, the electronic device 101 (e.g., the processor 150) may obtain the schedule information based on information included in an application of a user. For example, the electronic device 101 may obtain the information through a user schedule application, an e-mail application, conversation content through a SNS application, or the like.

In operation 320, the electronic device 101 (e.g., the processor 150) may determine whether an event corresponding to the schedule information occurs. The electronic device 101 may determine the event corresponding to the schedule information. For example, the electronic device 101 may determine the event corresponding to "301-dong" indicating a building number as the fact that the electronic device 101 is in a staying state, based on a prestored table. In the case where there is no movement of the electronic device 101 from "10:00 AM" for a specified time period (e.g., in the case where an acceleration value is smaller than a specified value), the electronic device 101 may determine that the event corresponding to the schedule information occurs.

In the case where the event occurs, in operation 330, the electronic device 101 (e.g., the processor 150) may store POI information including a location name included in the schedule information and location information of the electronic device 101. If the event occurs, the electronic device 101 may obtain location information by using a communication circuit. For example, in the case where there is no movement of the electronic device 101 from "10:00 AM" for a specified time period, the electronic device 101 may obtain coordinates of the electronic device 101. The electronic device 101 may generate the POI information including "301-dong" and the obtained coordinates and may store the generated POI information. After the POI information is stored, if a user searches for a place by using a search term "301-dong" in a map application, the electronic device 101 may display the coordinates included in the POI information. In addition, the electronic device 101 may display a text "301-dong" on the coordinates included in the POI information of a map. As described above, in the case where the user refers to a place by using another name (e.g., 301-dong) other than an official name (e.g., the first engineering building, Seoul National University), the personalized POI database may be built by automatically generating and storing the POI information, which includes a corresponding name, based on the user data.

Figure 4:
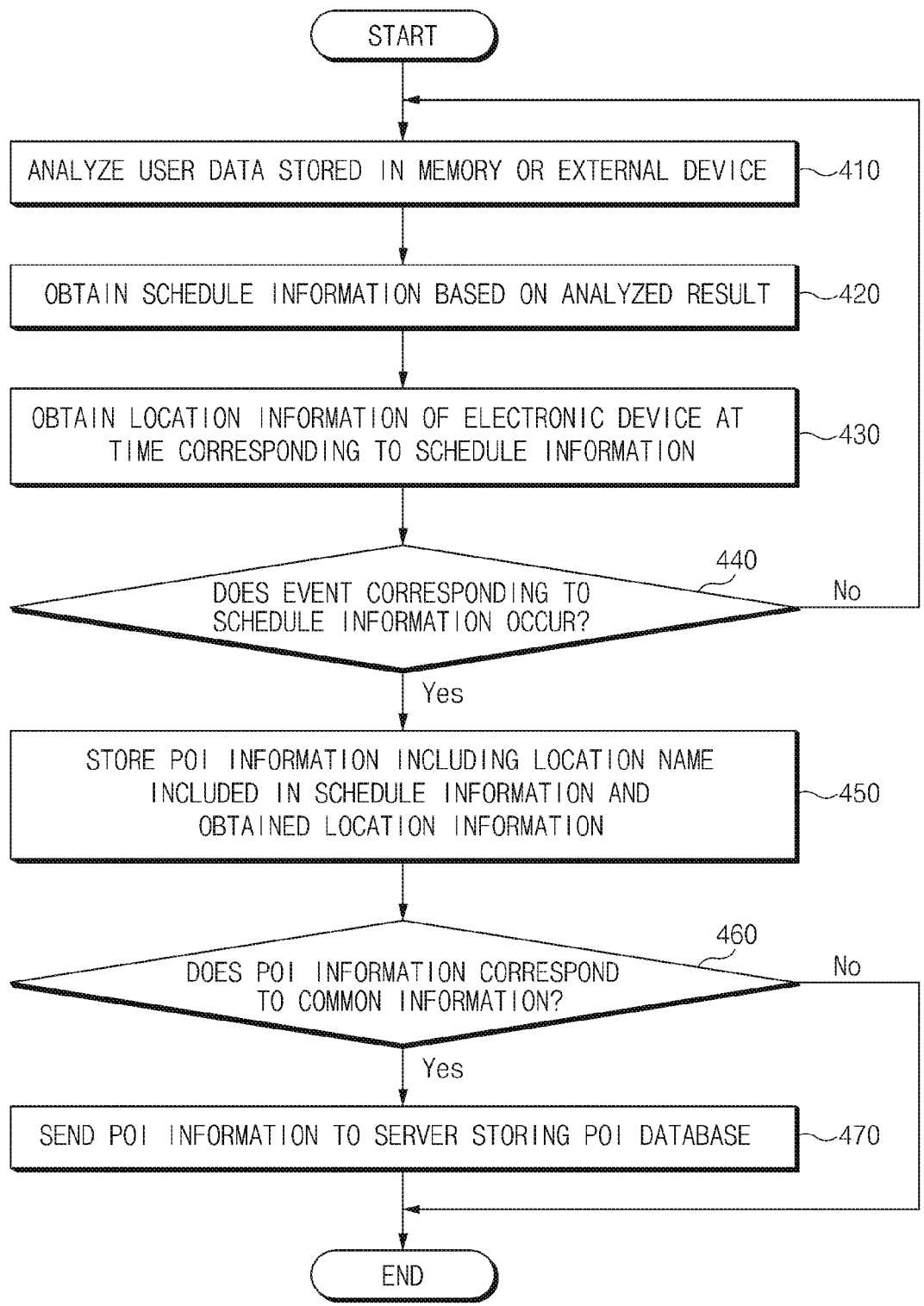
FIG. 4 illustrates a flowchart for describing a POI information updating method of an electronic device according to an embodiment of the present disclosure.

FIG. 4 illustrates a flowchart for describing a POI information updating method of an electronic device according to an embodiment of the present disclosure. For convenience of description, a detailed description about an operation described with reference to FIG. 3 will not be repeated here.

The flowchart illustrated in FIG. 4 may include operations which the electronic device 101 illustrated in FIG. 1 processes. Even though omitted below, the above description about the electronic device 101 given with reference to FIG. 1 may be applied to the method illustrated in FIG. 4.

Referring to FIG. 4, in operation 410, the electronic device 101 (e.g., the processor 150) may analyze user data stored in a memory or an external device. The electronic device 101 may analyze the user data, for example, a short message, a multimedia message, an instant message, a calendar schedule list, an e-mail, application data, or the like which is stored in the memory or the external device. The electronic device 101 may analyze the user data by using, for example, a keyword extraction algorithm. The electronic device 101 may extract a keyword by analyzing the user data.

In operation 420, the electronic device 101 (e.g., the processor 150) may obtain schedule information based on the analyzed result. For example, the electronic device 101 may generate the schedule information by using a keyword associated with place and time of the extracted keyword.

In operation 430, the electronic device 101 (e.g., the processor 150) may obtain location information of the electronic device 101 at a time corresponding to the schedule information. For example, if the time included in the schedule information comes, the electronic device 101 may obtain location information of the electronic device 101 by using a communication circuit, a sensor (e.g., a GPS sensor) included in the electronic device, or the like.

In operation 440, the electronic device 101 (e.g., the processor 150) may determine whether an event corresponding to the schedule information occurs.

In the case where the event occurs, in operation 450, the electronic device 101 (e.g., the processor 150) may store POI information including the location name included in the schedule information and the obtained location information.

In operation 460, the electronic device 101 (e.g., the processor 150) may determine whether the POI information corresponds to common information. If a specified condition (e.g., whether to include a specified keyword) is satisfied, the electronic device 101 may determine that the POI information corresponds to the common information. For example, since personal information of a user is leaked, the electronic device 101 may determine that the POI information in which the location name is set to "home," "workplace," or the like is not the common information. As another example, since the POI information in which the location name is set to "concert hall," "movie theater," or the like is suitable to share with a plurality of users, the electronic device 101 may determine that the POI information is the common information.

In the case where the POI information corresponds to the common information, in operation 470, the electronic device 101 (e.g., the processor 150) may send the POI information to a server, which stores a POI database, by using the communication circuit. The server may update the POI database by using the POI information received from the electronic device 101. As described above, the POI information without the concern of leakage of the personal information may be shared with the plurality of users by sending the common information, which satisfies the specified condition, from among the pieces of POI information to the server.

Figure 5:
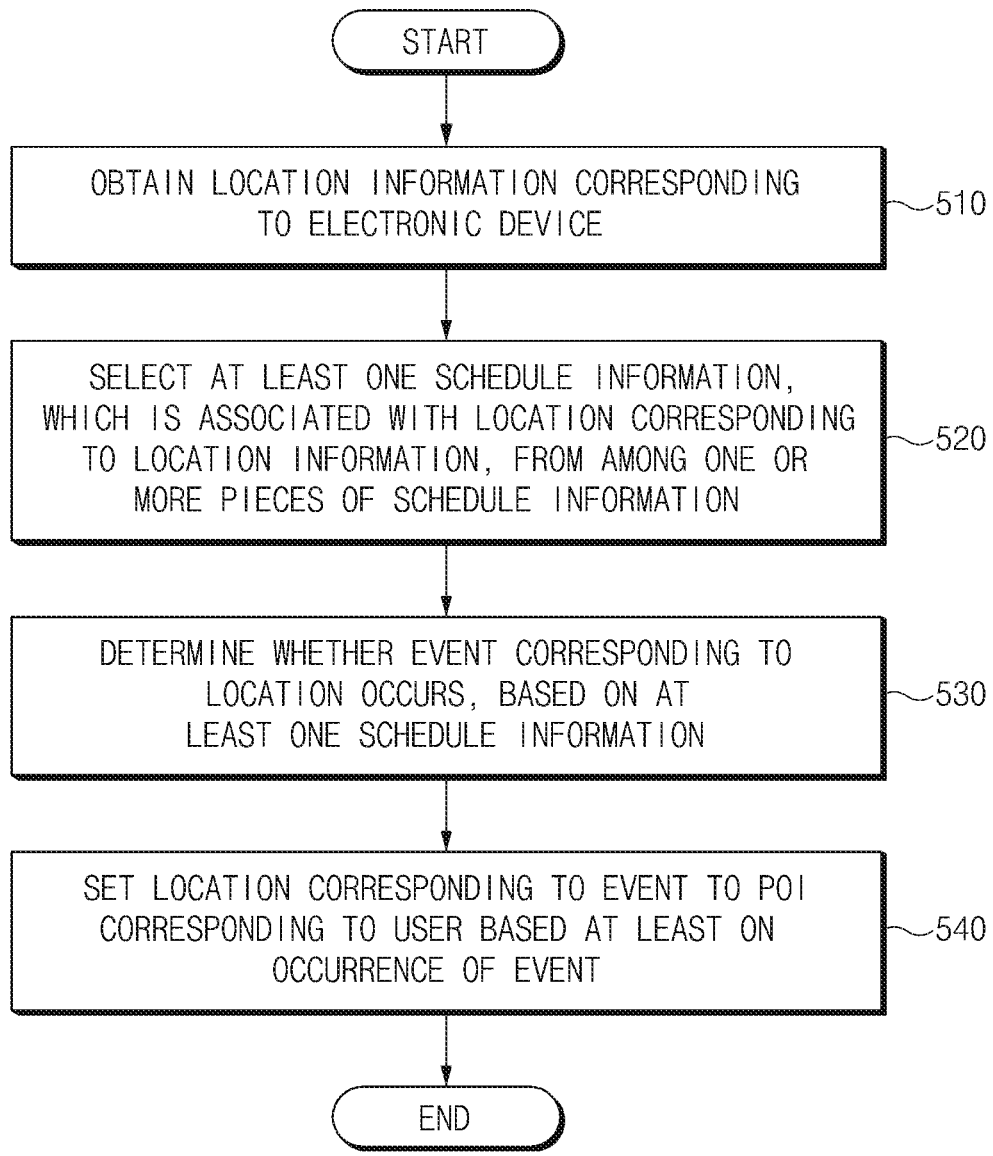
FIG. 5 illustrates a flowchart for describing a POI information updating method of an electronic device according to an embodiment of the present disclosure.

FIG. 5 illustrates a flowchart for describing a POI information updating method of an electronic device according to an embodiment of the present disclosure.

The flowchart illustrated in FIG. 5 may include operations which the electronic device 101 illustrated in FIG. 1 processes. Even though omitted below, the above description about the electronic device 101 given with reference to FIG. 1 may be applied to the method illustrated in FIG. 5.

Referring to FIG. 5, in operation 510, the electronic device 101 (e.g., the processor 150) may obtain location information corresponding to the electronic device 101. The electronic device 101 may obtain the location information of the electronic device 101 by using a communication circuit.

In operation 520, the electronic device 101 (e.g., the processor 150) may select at least one schedule information, which is associated with a location corresponding to the location information, from among one or more pieces of schedule information. The electronic device 101 may select schedule information including a location name, which is associated with a current location of the electronic device 101, from among the one or more pieces of schedule information, and may select schedule information including a time, which is associated with a current time, from among the one or more pieces of schedule information. For example, the electronic device 101 may obtain the schedule information including a location name "park" and a time "7:00 PM" from a text message including a text indicating that "let's meet at a park at 7:00 PM." At 7:00 PM, the electronic device 101 may select the above-mentioned schedule information. Alternatively, in the case where the current location of the electronic device 101 is one of parks in map information, the electronic device 101 may select the above-mentioned schedule information.

In operation 530, the electronic device 101 (e.g., the processor 150) may determine whether an event corresponding to a location occurs, based on the at least one schedule information. For example, the electronic device 101 may determine the event corresponding to "park" as the fact that the electronic device 101 moves at a walking speed, based on a prestored table. In the case where the electronic device 101 moves at a walking speed from "7:00 PM" for a specified time period (e.g., in the case where speed or acceleration is sensed within a specified range), the electronic device 101 may determine that the event occurs.

In operation 540, the electronic device 101 (e.g., the processor 150) may set a location corresponding to the event to a POI corresponding to a user, based at least on occurrence of the event. If the event occurs, the electronic device 101 may generate POI information. As described above, in the case where the user refers to a specific location (e.g., a park situated in front of a house) by using a general name (e.g., a park), the POI information in which a general name corresponds to a specific location may be automatically generated on the basis of user data. In addition, reliability of the personalized POI database may be improved by storing the POI information only if the event (e.g., walking) corresponding to a location name (e.g., a park) occurs.

Figure 6:
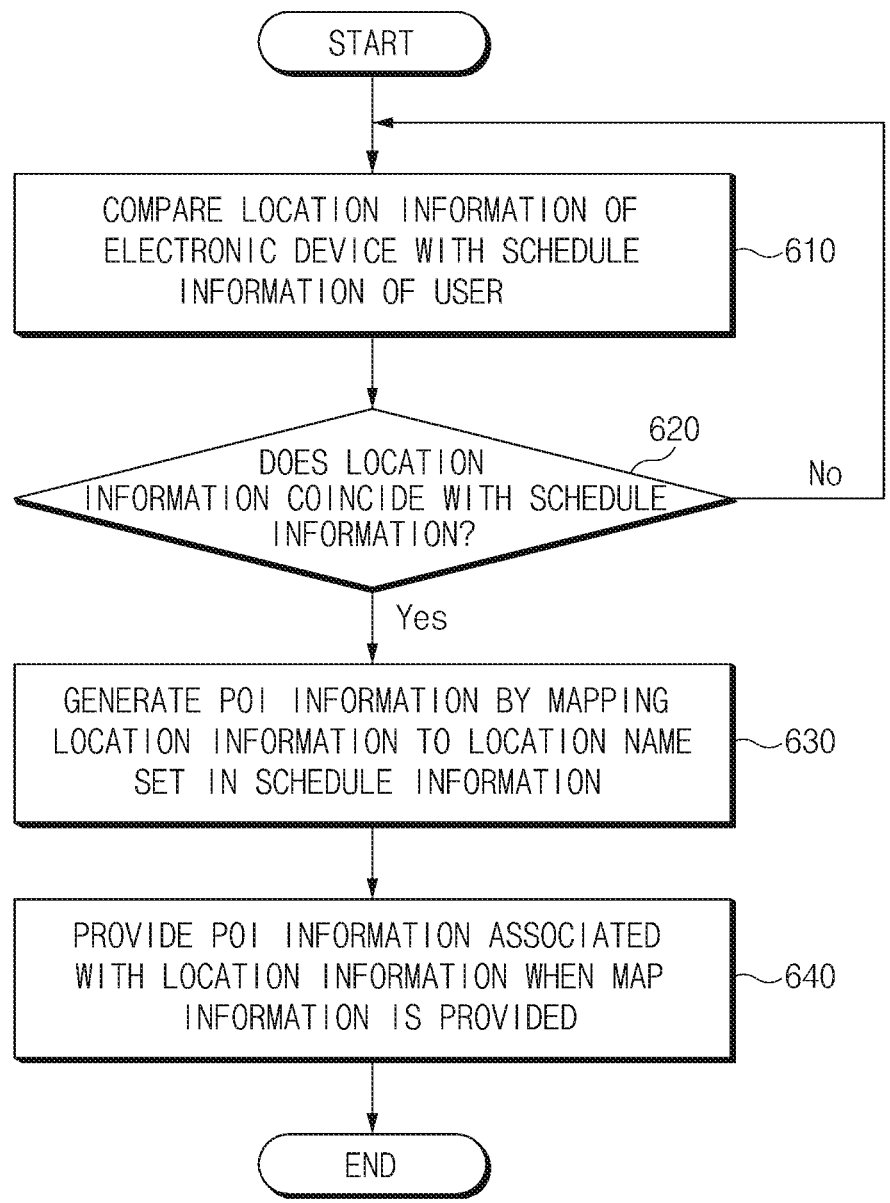
FIG. 6 illustrates a flowchart for describing a POI information updating method of an electronic device according to an embodiment of the present disclosure.

FIG. 6 of the present disclosure a flowchart for describing a POI information updating method of an electronic device according to an embodiment of the present disclosure.

The flowchart illustrated in FIG. 6 may include operations which the electronic device 101 illustrated in FIG. 1 processes. Even though omitted below, the above description about the electronic device 101 given with reference to FIG. 1 may be applied to the method illustrated in FIG. 6.

Referring to FIG. 6, in operation 610, the electronic device 101 (e.g., the processor 150) may compare location information of the electronic device 101 with schedule information of a user. The location information may include, for example, an acceleration value and a coordinate value. For example, the electronic device 101 may compare the schedule information, which includes a location name "movie theater" and a time "8:00 PM," with the acceleration value (or the coordinate value).

In operation 620, the electronic device 101 (e.g., the processor 150) may determine whether the location information coincides with the schedule information. For example, in the case where there is no movement of the electronic device 101 at the time "8:00 PM" (or in the case where magnitude of acceleration is smaller than a specified value), the electronic device 101 may determine that the schedule information including the location name "movie theater" is the same as the location information. As another example, in the case where the electronic device 101 moves at time "8:00 PM" at a walking speed, the electronic device 101 may determine that the schedule information is not the same as the location information.

In operation 630, the electronic device 101 (e.g., the processor 150) may generate POI information by mapping the location information to the location name set in the schedule information. For example, the electronic device 101 may generate the POI information by mapping the coordinate value of the electronic device 101, which is obtained at "8:00 PM," to the location name "movie theater."

In operation 640, when map information is provided, the electronic device 101 (e.g., the processor 150) may provide the POI information associated with location information. For example, the electronic device 101 may display the location name "movie theater" on the above-mentioned coordinates in a map displayed when executing a map application. As another example, if a search term "movie theater" is entered, the electronic device 101 may display the above-mentioned coordinates by using the map application.

Figure 7:
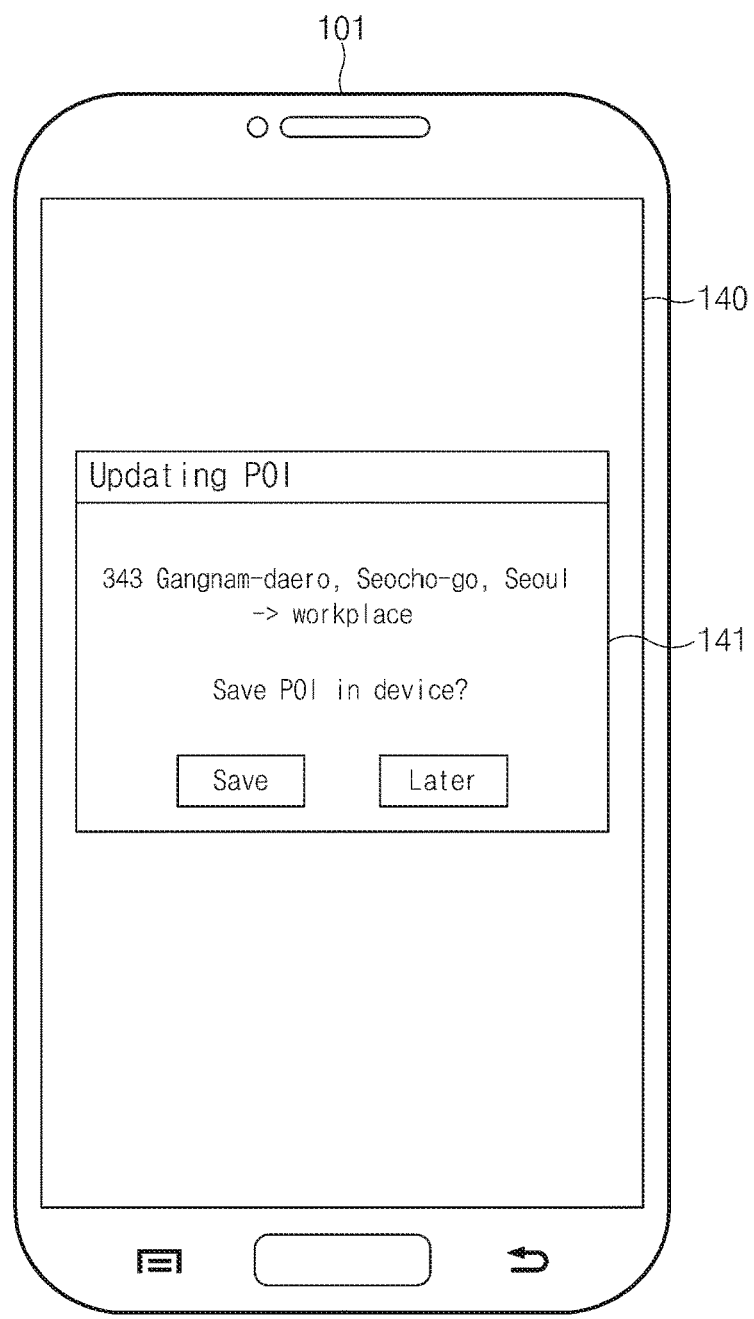
FIG. 7 illustrates an exemplary user interface that an electronic device provides according to an embodiment of the present disclosure.

FIG. 7 illustrates an exemplary user interface that an electronic device provides, according to an embodiment. According to an embodiment, an electronic device may display a user interface for determining whether to store POI information, by using a display.

Referring to FIG. 7, the electronic device 101 may display a popup box 141 by using the display 140. The popup box 141 may include, for example, an address (e.g., 343 Gangnam-daero, Seocho-go, Seoul) of a location and a location name (e.g., a workplace) and may include a button for determining whether to store the POI information. The electronic device 101 may obtain schedule information, which includes the location name "workplace," from user data. In the case where a user stays at a specific location at a time corresponding to the schedule information, the electronic device may generate the POI information including the location name "workplace" and information (e.g., the address of the location) about a location at which the user stays. If an event corresponding to the schedule information occurs, the electronic device 101 may generate the POI information. Before storing the generated POI information, the electronic device 101 may display the popup box 141 including the location name and location information that are included in the POI information. If receiving a touch input to a "Save" button from the user, the electronic device 101 may store the generated POI information. If receiving a touch input to a "Later" button from the user, the electronic device 101 may not store the generated POI information.

As described above, reliability of the personalized POI database may be improved by providing the user with the user interface (e.g., the popup box 141) for determining whether to store the POI information, after the POI information is generated.

Figure 8:
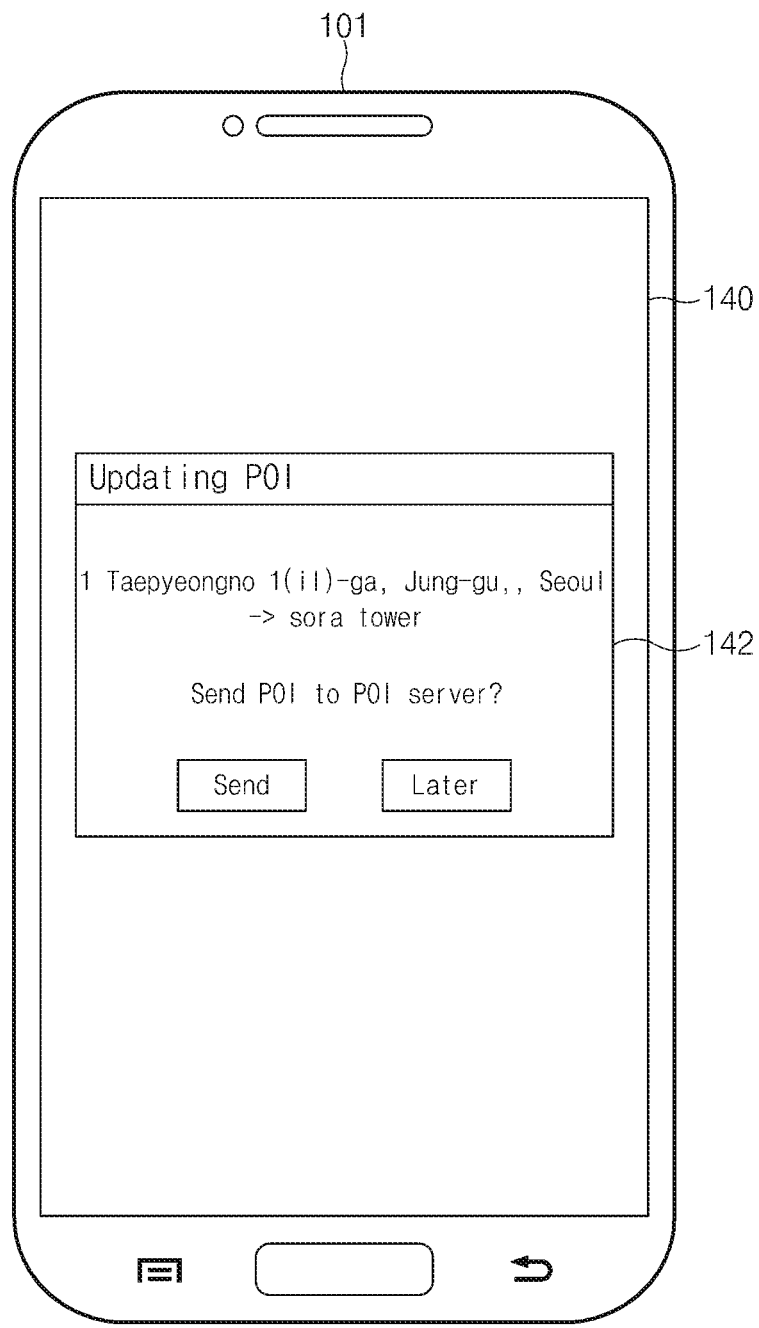
FIG. 8 illustrates an exemplary user interface that an electronic device provides according to an embodiment of the present disclosure.

FIG. 8 illustrates an exemplary user interface that an electronic device provides, according to an embodiment of the present disclosure. According to an embodiment, an electronic device may display a user interface for determining whether to send POI information, by using a display.

Referring to FIG. 8, the electronic device 101 may display a popup box 142 by using the display 140. The popup box 142 may include, for example, an address (e.g., 1 Taepyeongno 1 (il)-ga, Jung-gu, Seoul) of a location and a location name (e.g., sora tower) and may include a button for determining whether to send the POI information. The electronic device 101 may obtain schedule information, which includes the location name "sora tower", from user data. Hereinafter, the "sora tower" may be another name of sculpture situated in Cheonggye Plaza Seoul. In the case where a user stays at a specific location at a time corresponding to the schedule information, the electronic device 101 may generate the POI information including the location name "sora tower" and information (e.g., the address of the location) about a location at which the user stays. If an event corresponding to the schedule information occurs, the electronic device 101 may generate the POI information. Before sending the generated POI information, the electronic device 101 may display the popup box 142 including the location name and the location information that are included in the POI information. If receiving a touch input to a "Send" button from the user, the electronic device 101 may send the generated POI information to a server. If receiving a touch input to a "Later" button from the user, the electronic device 101 may not send the generated POI information.

As described above, an opportunity for filtering transmission of the POI information may be provided to the user by providing the user with the user interface (e.g., a popup box) for determining whether to send the POI information, after the POI information is generated.

Figure 9:
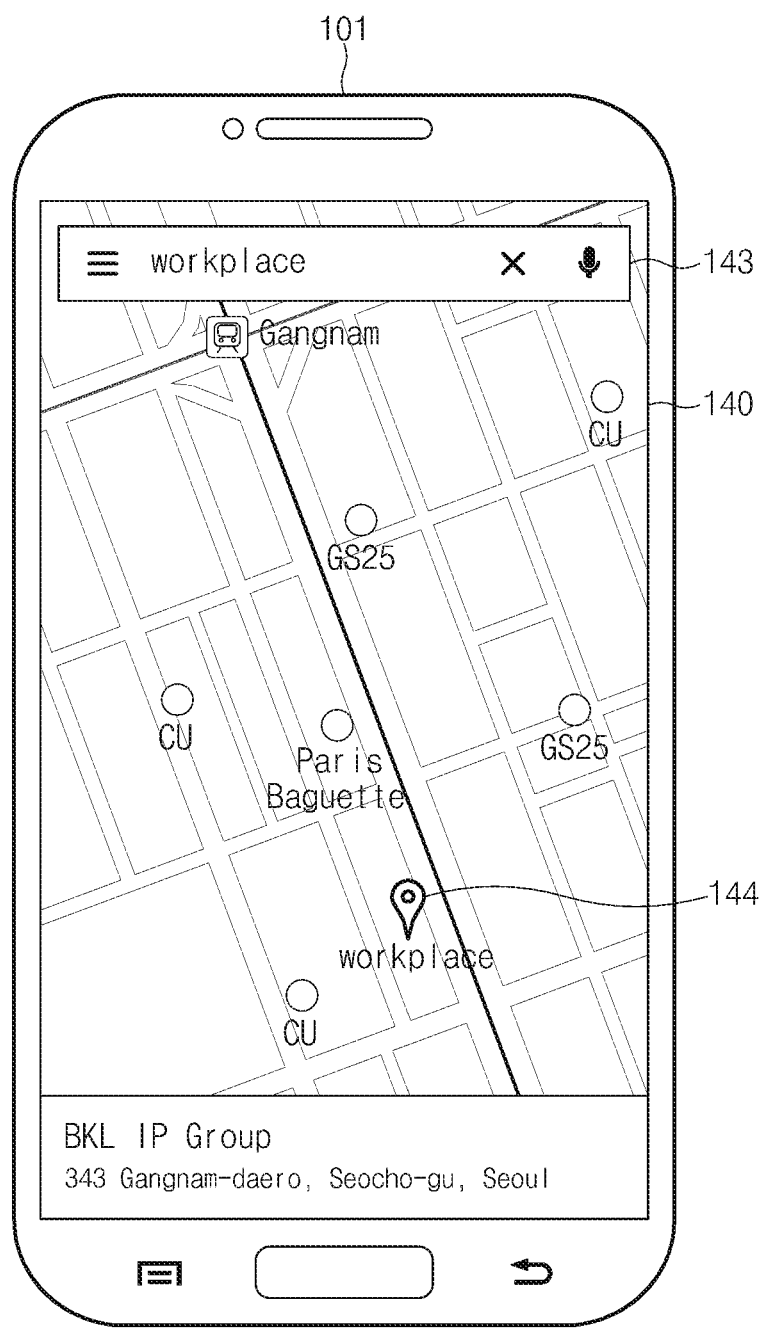
FIG. 9 illustrates an exemplary embodiment in which an electronic device searches for a place according to an embodiment of the present disclosure.

FIG. 9 illustrates an exemplary embodiment in which an electronic device searches for a place, according to an embodiment of the present disclosure.

Referring to FIG. 9, the electronic device 101 may execute a map application. The electronic device 101 may display map information by using the display 140. If a user enters a search term in a search box 143, the electronic device 101 may display POI information corresponding to the search term. For example, in the case where the POI information including a location name "workplace" and an address "343 Gangnam-daero, Seocho-go, Seoul 343 Gangnam-daero, seocho-gu, Seoul" is stored, if the user enters a search term "workplace" in the search box 143, the electronic device 101 may display a marker 144 at a location corresponding to the above-mentioned POI information on a map. The electronic device 101 may display information corresponding to the found POI information in a lower end area of the display 140. The electronic device 101 may display the location name "workplace" at the location corresponding to the address "343 Gangnam-daero, Seocho-go, Seoul."

As described above, a map application service may be provided on the basis of a language that the user actually employs without the cumbersome process in which the user directly enters the information, by providing the user with the automatically generated POI information based on user data.

Figure 10:
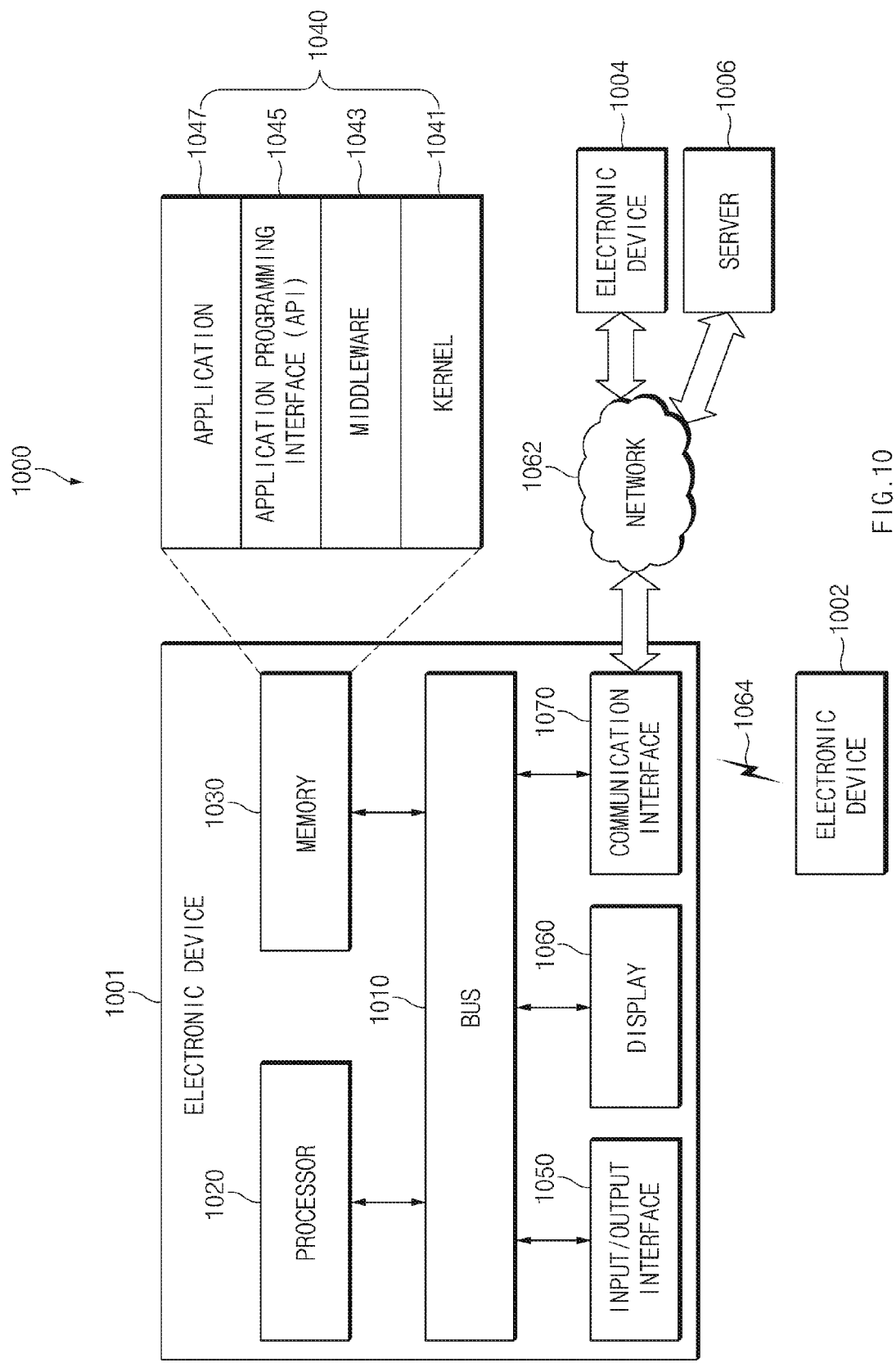
FIG. 10 illustrates an electronic device in a network environment according to various embodiments of the present disclosure.

FIG. 10 illustrates an electronic device in a network environment according to various embodiments of the present disclosure.

Referring to FIG. 10, according to various embodiments, an electronic device 1001, 1002, or 1004 or a server 1006 may be connected with each other through a network 1062 or a local area network 1064. The electronic device 1001 may include a bus 1010, a processor 1020, a memory 1030, an input/output (I/O) interface 1050, a display 1060, and a communication interface 1070. According to an embodiment, the electronic device 1001 may not include at least one of the above-described elements or may further include other element(s).

The bus 1010 may interconnect the above-described elements 1010 to 1070 and may be a circuit for conveying communications (e.g., a control message and/or data) among the above-described elements.

The processor 1020 may include one or more of a central processing unit (CPU), an application processor (AP), or a communication processor (CP). The processor 1020 may perform, for example, data processing or an operation associated with control or communication of at least one other element(s) of the electronic device 1001.

The memory 1030 may include a volatile and/or nonvolatile memory. For example, the memory 1030 may store instructions or data associated with at least one other element(s) of the electronic device 1001. According to an embodiment, the memory 1030 may store software and/or a program 1040. The program 1040 may include, for example, a kernel 1041, a middleware 1043, an application programming interface (API) 1045, and/or an application program (or "application") 1047. At least a part of the kernel 1041, the middleware 1043, or the API 1045 may be called an "operating system (OS)."

The kernel 1041 may control or manage system resources (e.g., the bus 1010, the processor 1020, the memory 1030, and the like) that are used to execute operations or functions of other programs (e.g., the middleware 1043, the API 1045, and the application program 1047). Furthermore, the kernel 1041 may provide an interface that allows the middleware 1043, the API 1045, or the application program 1047 to access discrete elements of the electronic device 1001 so as to control or manage system resources.

The middleware 1043 may perform, for example, a mediation role such that the API 1045 or the application program 1047 communicates with the kernel 1041 to exchange data.

Furthermore, the middleware 1043 may process one or more task requests received from the application program 1047 according to a priority. For example, the middleware 1043 may assign the priority, which makes it possible to use a system resource (e.g., the bus 1010, the processor 1020, the memory 1030, or the like) of the electronic device 1001, to at least one of the application program 1047. For example, the middleware 1043 may process the one or more task requests according to the priority assigned to the at least one, which makes it possible to perform scheduling or load balancing on the one or more task requests.

The API 1045 may be an interface through which the application program 1047 controls a function provided by the kernel 1041 or the middleware 1043, and may include, for example, at least one interface or function (e.g., an instruction) for a file control, a window control, image processing, a character control, or the like.

The I/O interface 1050 may transmit an instruction or data, input from a user or another external device, to other element(s) of the electronic device 1001. Furthermore, the I/O interface 1050 may output an instruction or data, received from other component(s) of the electronic device 1001, to a user or another external device.

The display 1060 may include, for example, a liquid crystal display (LCD), a light-emitting diode (LED) display, an organic LED (OLED) display, a microelectromechanical systems (MEMS) display, or an electronic paper display. The display 1060 may display, for example, various kinds of contents (e.g., a text, an image, a video, an icon, a symbol, or the like) to a user. The display 1060 may include a touch screen and may receive, for example, a touch, gesture, proximity, or hovering input using an electronic pen or a portion of a user's body.

The communication interface 1070 may establish communication between the electronic device 1001 and an external device (e.g., a first external electronic device 1002, a second external electronic device 1004, or a server 1006). For example, the communication interface 1070 may be connected to a network 1062 through wireless communication or wired communication to communicate with the external device (e.g., the second external electronic device 1004 or the server 1006).

The wireless communication may include at least one of, for example, a long-term evolution (LTE), an LTE Advance (LTE-A), a code division multiple access (CDMA), a wideband CDMA (WCDMA), a universal mobile telecommunications system (UMTS), a wireless broadband (WiBro), a global system for mobile communications (GSM), or the like, as a cellular communication protocol. Furthermore, the wireless communication may include, for example, the local area network 1064. The local area network 1064 may include at least one of a wireless fidelity (Wi-Fi), a Bluetooth, a near field communication (NFC), a magnetic stripe transmission (MST), a global navigation satellite system (GNSS), or the like.

The MST may generate a pulse in response to transmission data by using an electromagnetic signal, and the pulse may generate a magnetic field signal. The electronic device 1001 may send the magnetic field signal to point of sale (POS). The POS may detect the magnetic field signal using a MST reader and may recover the data by converting the detected magnetic field signal to an electrical signal.

The GNSS may include at least one of a global positioning system (GPS), a global navigation satellite system (Glonass), a Beidou Navigation Satellite System (hereinafter referred to as "Beidou"), or a European global satellite-based navigation system (Galileo). Hereinafter, "GPS" and "GNSS" may be used interchangeably in the present disclosure. The wired communication may include at least one of, for example, a universal serial bus (USB), a high definition multimedia interface (HDMI), a recommended standard-232 (RS-232), a plain old telephone service (POTS), or the like. The network 1062 may include at least one of telecommunications networks, for example, a computer network (e.g., LAN or WAN), an Internet, or a telephone network.

Each of the first and second external electronic devices 1002 and 1004 may be a device of which the type is different from or the same as that of the electronic device 1001. According to an embodiment, the server 1006 may include a server or a group of two or more servers. According to various embodiments, all or a part of operations that the electronic device 1001 will perform may be executed by another or plural electronic devices (e.g., the electronic device 1002 or 1004 or the server 1006). According to an embodiment, in the case where the electronic device 1001 executes any function or service automatically or in response to a request, the electronic device 1001 may not perform the function or the service internally, but, alternatively additionally, it may request at least a portion of a function associated with the electronic device 101 from other devices (e.g., the electronic device 1002 or 1004 or the server 1006). The other electronic device (e.g., the electronic device 1002 or 1004 or the server 1006) may execute the requested function or additional function and may transmit the execution result to the electronic device 1001. The electronic device 1001 may provide the requested function or service by processing the received result as it is, or additionally. To this end, for example, cloud computing, distributed computing, or client-server computing may be used.

Figure 11:
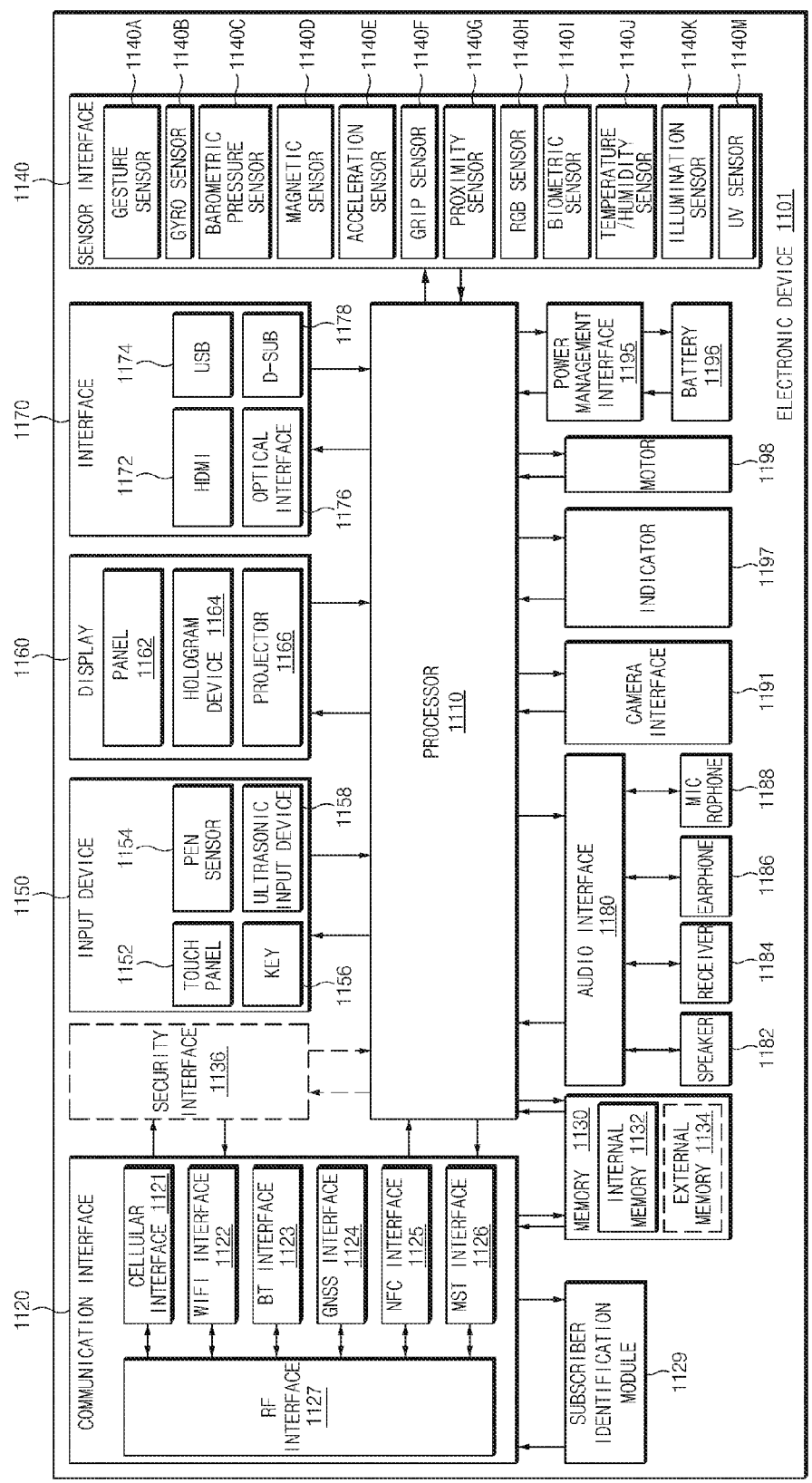
FIG. 11 illustrates an electronic device according to various embodiments of the present disclosure.

FIG. 11 illustrates a block diagram of an electronic device according to an embodiment of the present disclosure.

Referring to FIG. 11, the electronic device 1101 may include, for example, all or a part of the electronic device 1001 illustrated in FIG. 10. The electronic device 1101 may include one or more processors (e.g., an application processor (AP)) 1110, a communication interface 1120, a subscriber identification module 1129, a memory 1130, a sensor 1140, an input device 1150, a display 1160, an interface 1170, an audio 1180, a camera 1191, a power management 1195, a battery 1196, an indicator 1197, and a motor 1198.

The processor 1110 may drive an operating system (OS) or an application program to control a plurality of hardware or software elements connected to the processor 1110 and may process and compute a variety of data. The processor 1110 may be implemented with a system on chip (SoC), for example. According to an embodiment, the processor 1110 may further include a graphic processing unit (GPU) and/or an image signal processor. The processor 1110 may include at least a part (e.g., a cellular interface 1121) of elements illustrated in FIG. 11. The processor 1110 may load and process an instruction or data, which is received from at least one of other components (e.g., a nonvolatile memory), and may store a variety of data in a nonvolatile memory.

The communication interface 1120 may be configured the same as or similar to a communication interface 1070 of FIG. 10. The communication interface 1120 may include a cellular interface 1121, a WI-FI interface 1122, a Bluetooth (BT) interface 1123, a GNSS interface 1124 (e.g., a GPS interface, a Glonass interface, a Beidou interface, or a Galileo interface), a near field communication (NFC) interface 1125, a MST interface 1126, and a radio frequency (RF) 1127.

The cellular interface 1121 may provide voice communication, video communication, a character service, an Internet service, or the like through a communication network. According to an embodiment, the cellular interface 1121 may perform discrimination and authentication of the electronic device 1101 within a communication network using the subscriber identification module 1129 (e.g., a SIM card), for example. According to an embodiment, the cellular interface 1121 may perform at least a portion of functions that the processor 1110 provides. According to an embodiment, the cellular interface 1121 may include a communication processor (CP).

Each of the WI-FI interface 1122, the BT interface 1123, the GNSS interface 1124, the NFC interface 1125, or the MST interface 1126 may include a processor for processing data exchanged through a corresponding module, for example. According to an embodiment, at least a part (e.g., two or more elements) of the cellular interface 1121, the WI-FI interface 1122, the BT interface 1123, the GNSS interface 1124, the NFC interface 1125, or the MST interface 1126 may be included within one integrated circuit (IC) or an IC package.

The RF 1127 may transmit and receive, for example, a communication signal (e.g., an RF signal). For example, the RF 1127 may include a transceiver, a power amplifier module (PAM), a frequency filter, a low noise amplifier (LNA), an antenna, or the like. According to another embodiment, at least one of the cellular interface 1121, the WI-FI interface 1122, the BT interface 1123, the GNSS interface 1124, the NFC interface 1125, or the MST interface 1126 may transmit and receive an RF signal through a separate RF.

The subscriber identification module 1129 may include, for example, a card and/or embedded SIM which includes a subscriber identification module and may include unique identification information (e.g., integrated circuit card identifier (ICCID)) or subscriber information (e.g., integrated mobile subscriber identity (IMSI)).

The memory 1130 (e.g., the memory 1030) may include an internal memory 1132 or an external memory 1134. For example, the internal memory 1132 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 1134 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1134 may be functionally and/or physically connected with the electronic device 1101 through various interfaces.

The security module 1136 may be a module that includes a storage space of which a security level is higher than that of the memory 1130 and may be a circuit that guarantees safe data storage and a protected execution environment. The security module 1136 may be implemented with a separate circuit and may include a separate processor. For example, the security module 1136 may be in a smart chip or a secure digital (SD) card, which is removable, or may include an embedded secure element (eSE) embedded in a fixed chip of the electronic device 1101. Furthermore, the security module 1136 may operate based on an operating system (OS) that is different from the OS of the electronic device 1101. For example, the security module 1136 may operate based on java card open platform (JCOP) OS.

The sensor 1140 may measure, for example, a physical quantity or may detect an operating state of the electronic device 1101. The sensor 1040 may convert the measured or detected information to an electric signal. For example, the sensor 1140 may include at least one of a gesture sensor 1140A, a gyro sensor 1140B, a pressure sensor 1140C, a magnetic sensor 1140D, an acceleration sensor 1140E, a grip sensor 1140F, a proximity sensor 1140G, a color sensor 1140H (e.g., a red, green, blue (RGB) sensor), a biometric sensor 1140I, a temperature/humidity sensor 1140J, an illuminance sensor 1140K, or an UV sensor 1140M. Although not illustrated, additionally or generally, the sensor 1140 may further include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor 1140 may further include a control circuit for controlling at least one or more sensors included therein. According to an embodiment, the electronic device 1101 may further include a processor which is a part of the processor 1110 or independent of the processor 1110 and is configured to control the sensor 1140. The processor may control the sensor 1140 while the processor 1110 remains at a sleep state.

The input device 1150 may include, for example, a touch panel 1152, a (digital) pen sensor 1154, a key 1156, or an ultrasonic input device 1158. The touch panel 1152 may use at least one of capacitive, resistive, infrared and ultrasonic detecting methods. Also, the touch panel 1152 may further include a control circuit. The touch panel 1152 may further include a tactile layer to provide a tactile reaction to a user.

The (digital) pen sensor 1154 may be, for example, a part of a touch panel or may include an additional sheet for recognition. The key 1156 may include, for example, a physical button, an optical key, a keypad, and the like. The ultrasonic input device 1158 may detect (or sense) an ultrasonic signal, which is generated from an input device, through a microphone (e.g., a microphone 1188) and may check data corresponding to the detected ultrasonic signal.

The display 1160 (e.g., the display 1060) may include a panel 1162, a hologram device 1164, or a projector 1166. The panel 1162 may be configured the same as or similar to the display 1060 of FIG. 10. The panel 1162 may be implemented to be flexible, transparent or wearable, for example. The panel 1162 and the touch panel 1152 may be integrated into a single module. The hologram device 1164 may display a stereoscopic image in a space using a light interference phenomenon. The projector 1166 may project light onto a screen so as to display an image. The screen may be arranged inside or outside the electronic device 1101. According to an embodiment, the display 1160 may further include a control circuit for controlling the panel 1162, the hologram device 1164, or the projector 1166.

The interface 1170 may include, for example, a high-definition multimedia interface (HDMI) 1172, a universal serial bus (USB) 1174, an optical interface 1176, or a D-subminiature (D-sub) 1178. The interface 1170 may be included, for example, in the communication interface 1070 illustrated in FIG. 10. Additionally or generally, the interface 1170 may include, for example, a mobile high definition link (MHL) interface, a SD card/multi-media card (MMC) interface, or an infrared data association (IrDA) standard interface.

The audio 1180 may convert a sound and an electric signal in dual directions. At least a part of the audio 1180 may be included, for example, in the I/O interface 1050 illustrated in FIG. 10. The audio 1180 may process, for example, sound information that is input or output through a speaker 1182, a receiver 1184, an earphone 1186, or a microphone 1188.

The camera 1191 for shooting a still image or a video may include, for example, at least one image sensor (e.g., a front sensor or a rear sensor), a lens, an image signal processor (ISP), or a flash (e.g., an LED or a xenon lamp).

The power management 1195 may manage, for example, power of the electronic device 1101. According to an embodiment, the power management 1195 may include a power management integrated circuit (PMIC), a charger IC, or a battery or fuel gauge. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1196 and a voltage, current or temperature thereof while the battery is charged. The battery 1196 may include, for example, a rechargeable battery or a solar battery.

The indicator 1197 may display a specific state of the electronic device 1101 or a part thereof (e.g., the AP 1110), such as a booting state, a message state, a charging state, or the like. The motor 1198 may convert an electrical signal into a mechanical vibration and may generate the following effects: vibration, haptic, and the like. Although not illustrated, the electronic device 1101 may include a processing device (e.g., a GPU) for supporting a mobile TV. The processing device for supporting a mobile TV may process media data according to the standards of digital multimedia broadcasting (DMB), digital video broadcasting (DVB), MediaFlo™, or the like.

Each of the above-mentioned elements of the electronic device in the present disclosure may be configured with one or more components, and the names of the elements may be changed according to the type of the electronic device. According to various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 12:
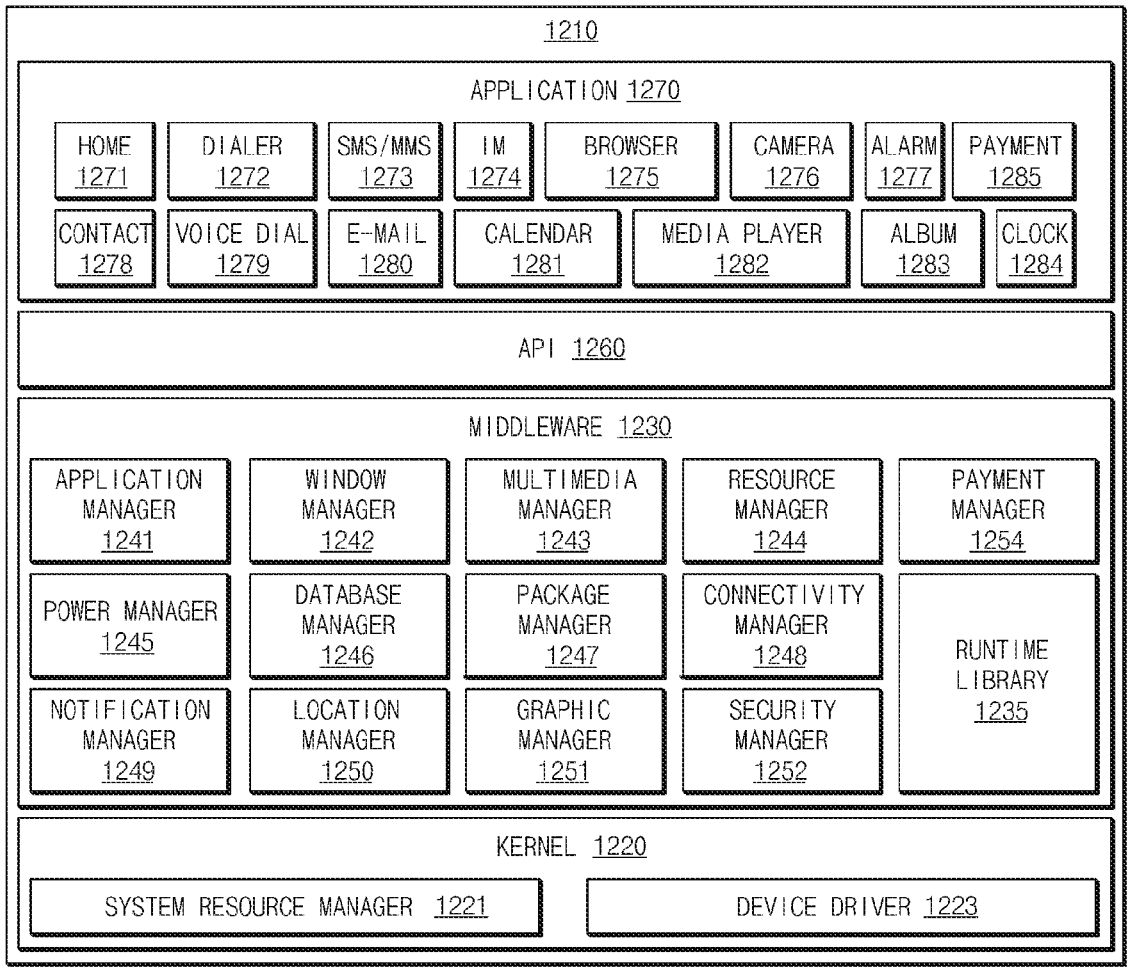
FIG. 12 illustrates a program module according to various embodiments of the present disclosure.

FIG. 12 illustrates a block diagram of a program module according to various embodiments of the present disclosure.

According to an embodiment, a program module 1210 (e.g., the program 1040) may include an operating system (OS) to control resources associated with an electronic device (e.g., the electronic device 1001), and/or diverse applications (e.g., the application program 1047) driven on the OS. The OS may be, for example, Android™, iOS™, Windows™, Symbian™, Tizen™, Bada™, or the like.

The program module 1210 may include a kernel 1220, a middleware 1230, an API 1260, and/or an application 1270. At least a part of the program module 1210 may be preloaded on an electronic device or may be downloadable from an external electronic device (e.g., the electronic device 1002 or 1004, the server 1006, or the like).

The kernel 1220 (e.g., the kernel 1041) may include, for example, a system resource manager 1221, or a device driver 1223. The system resource manager 1221 may perform control, allocation, or retrieval of system resources. According to an embodiment, the system resource manager 1221 may include a process managing part, a memory managing part, a file system managing part, or the like. The device driver 1223 may include, for example, a display driver, a camera driver, a Bluetooth driver, a common memory driver, an USB driver, a keypad driver, a Wi-Fi driver, an audio driver, or an inter-process communication (IPC) driver.

The middleware 1230 may provide, for example, a function which the application 1270 needs in common or may provide diverse functions to the application 1270 through the API 1260 to allow the application 1270 to efficiently use limited system resources of the electronic device. According to an embodiment, the middleware 1230 (e.g., the middleware 1043) may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, or a security manager 1252, or a payment manager 1254.

The runtime library 1235 may include, for example, a library module, which is used by a compiler, to add a new function through a programming language while the application 1270 is being executed. The runtime library 1235 may perform input/output management, memory management, capacities about arithmetic functions, or the like.

The application manager 1241 may manage, for example, a life cycle of at least one application of the application 1270. The window manager 1242 may manage a GUI resource which is used in a screen. The multimedia manager 1243 may identify a format necessary to play diverse media files, and may perform encoding or decoding of media files by using a codec suitable for the format. The resource manager 1244 may manage resources such as a storage space, memory, or source code of at least one application of the application 1270.

The power manager 1245 may operate, for example, with a basic input/output system (BIOS) to manage a battery or power, and may provide power information for an operation of an electronic device. The database manager 1246 may generate, search for, or modify database to be used in at least one application of the application 1270. The package manager 1247 may install or update an application which is distributed in the form of a package file.

The connectivity manager 1248 may manage, for example, wireless connection such as Wi-Fi or Bluetooth. The notification manager 1249 may display or notify an event such as an arrival message, an appointment, or a proximity notification in a mode that does not disturb a user. The location manager 1250 may manage location information of an electronic device. The graphic manager 1251 may manage a graphic effect to be provided to a user or a user interface relevant thereto. The security manager 1252 may provide a general security function necessary for system security, user authentication, or the like. According to an embodiment, in the case where an electronic device (e.g., the electronic device 1001 of FIG. 10) includes a telephony function, the middleware 1230 may further includes a telephony manager for managing a voice or video call function of the electronic device.

The middleware 1230 may include a middleware module that combines diverse functions of the above-described elements. The middleware 1230 may provide a module specialized to each OS kind to provide differentiated functions. In addition, the middleware 1230 may remove a part of the preexisting elements, dynamically, or may add new elements thereto.

The API 1260 (e.g., the API 1045) may be, for example, a set of programming functions and may be provided with a configuration which is variable depending on an OS. For example, in the case where an OS is the android or the iOS™, it may be permissible to provide one API set per platform. In the case where an OS is the Tizen™, it may be permissible to provide two or more API sets per platform.

The application 1270 (e.g., the application program 1047) may include, for example, one or more applications capable of providing functions for a home 1271, a dialer 1272, an SMS/MMS 1273, an instant message (IM) 1274, a browser 1275, a camera 1276, an alarm 1277, a contact 1278, a voice dial 1279, an e-mail 1280, a calendar 1281, a media player 1282, an album 1283, and a clock 1284, or for offering health care (e.g., measuring an exercise quantity or blood sugar) or environment information (e.g., information of barometric pressure, humidity, or temperature).

According to an embodiment, the application 1270 may include an application (hereinafter referred to as "information exchanging application" for descriptive convenience) to support information exchange between the electronic device (e.g., the electronic device 1001) and an external electronic device (e.g., the electronic device 1002 or 1004). The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., an electronic device 1002 or 1004). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the electronic device 1002 or 1004) which communicates with the electronic device, an application running in the external electronic device, or a service (e.g., a call service, a message service, or the like) provided from the external electronic device.

According to an embodiment, the application 1270 may include an application (e.g., a health care application of a mobile medical device, and the like) which is assigned in accordance with an attribute of the external electronic device (e.g., the electronic device 1002 or 1004). According to an embodiment, the application 1270 may include an application which is received from an external electronic device (e.g., the server 1006 or the electronic device 1002 or 1004). According to an embodiment, the application 1270 may include a preloaded application or a third party application which is downloadable from a server. The component titles of the program module 1210 according to the embodiment may be modifiable depending on kinds of operating systems.

According to various embodiments, at least a part of the program module 1210 may be implemented by software, firmware, hardware, or a combination of two or more thereof. At least a part of the program module 1210 may be implemented (e.g., executed), for example, by a processor (e.g., the processor 1110). At least a portion of the program module 1210 may include, for example, a module, a program, a routine, sets of instructions, or a process for performing one or more functions.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1020), may cause the one or more processors to perform a function corresponding to the instruction. The computer-readable storage media, for example, may be the memory 1030.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate as one or more software modules to perform an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, a part of operations may be executed in different sequences or may be omitted. Alternatively, other operations may be added.

According to various embodiments of the present disclosure, the inconvenience of a user that has to enter data directly to update a POI database may be solved by analyzing user information and automatically generating POI information.

In addition, the personalized POI database to which a name frequently employed by the user is applied may be built by analyzing user information formed of a language that the user employs.

Furthermore, the accuracy of the POI database may be improved by determining reliability of the POI information and selectively storing the POI information with high-reliability.

Moreover, the POI database to which a name that a plurality of users employ is applied may be built by sharing the POI information in a server storing the POI database.

Besides, a variety of effects directly or indirectly understood through this disclosure may be provided.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a memory configured to store one or more pieces of schedule information of a user of the electronic device; and
   a processor configured to:
   obtain location information corresponding to the electronic device;
   select, from the one or more pieces of schedule information, schedule information that is associated with a location the location information;
   sense an action of the user coincided with the location based on the selected schedule information; and
   set the location to a point of interest (POI) corresponding to the user if the action of the user is sensed,
   wherein the POI includes a name of the location included in the selected schedule information.

2. The electronic device of claim 1, further comprising:
   a communication circuit, wherein the processor is configured to obtain one or more pieces of schedule information from an external electronic device using the communication circuit.

3. The electronic device of claim 1, wherein the processor is configured to sense the action of the user based on a function that is executed at a time corresponding to the one or more pieces of schedule information by the electronic device.

4. The electronic device of claim 3, wherein the processor is configured to:

obtain context information comprising information associated with the location of the electronic device and movement of the electronic device; and change at least a portion of the POI based on the context information.

5. The electronic device of claim 1, wherein the processor is configured to:

obtain information associated with at least one of the location of the electronic device, movement of the electronic device, or a time; and sense the action of the user based on the obtained information.

6. An electronic device comprising:

a memory storing user data; and a processor electrically connected with the memory, wherein the processor is configured to:

obtain, from the user data stored in the memory, schedule information that comprises a location name and a time;

generate POI information that comprises the location name and location information of the electronic device included in the user data if an action of a user of the electronic device coincided with the schedule information is sensed; and store the generated POI information in the memory.

7. The electronic device of claim 6, further comprising:

a communication circuit configured to communicate with a server storing a POI database, wherein the processor is configured to send the POI information to the server using the communication circuit.

8. The electronic device of claim 7, wherein the processor is further configured to send the POI information to the server if the POI information satisfies a specified condition.

9. The electronic device of claim 7, further comprising:

a display electrically connected with the processor, wherein the processor is configured to display, on the display, a user interface for determining whether to send the POI information.

10. The electronic device of claim 6, further comprising:

a communication circuit configured to communicate with an external device, wherein the processor is configured to obtain, from user data, the schedule information that is stored in the external device using the communication circuit.

11. The electronic device of claim 10, wherein the processor is configured to obtain the schedule information from the user data comprising at least one of a short message, a multimedia message, an instant message, an e-mail, or application data that is stored in at least one of the memory or the external device.

12. The electronic device of claim 6, further comprising:

a communication circuit comprising at least one of a cellular interface, a WI-FI interface, a Bluetooth interface, or a global navigation satellite system (GNSS) interface, wherein the processor is configured to obtain the location information using the communication circuit.

13. The electronic device of claim 6, wherein the processor is further configured to sense the action of the user corresponding to the location name at the time.

14. The electronic device of claim 6, further comprising:

a sensor configured to sense acceleration that acts on the electronic device, wherein the processor is configured to sense the action of the user based on magnitude of the acceleration sensed by the sensor.

15. The electronic device of claim 14, wherein the processor is further configured to determine that the action of the user corresponding to the schedule information is sensed, if the acceleration is sensed within a specified range.

16. The electronic device of claim 6, wherein the processor is further configured to determine an action that is mapped to the location name as the action of the user corresponding to the schedule information in a prestored table.

17. The electronic device of claim 6, further comprising:

a display electrically connected with the processor, wherein the processor is configured to display, on the display, a user interface for determining whether to store the POI information.

18. The electronic device of claim 6, wherein the processor is further configured to store the POI information if a message indicating arrival is sent or received at the time.

19. The electronic device of claim 6, wherein the processor is further configured to recognize a voice that is sent or received during at least one of an outgoing or an incoming call at the time; and store the POI information if the voice comprises a voice indicating arrival.

20. An electronic device comprising:

a memory storing map information and schedule information of a user;

a sensor configured to sense movement of the electronic device;

a communication circuit configured to collect location information of the electronic device; and a processor electrically connected with the memory, the sensor, and the communication circuit, wherein the processor is configured to:

compare the location information of the electronic device that is obtained through at least one of the sensor or the communication circuit with the schedule information;

sense an action of the user coincided with the schedule information based on the location information of the electronic device;

generate POI information including a location name included in the schedule information and the location information by mapping the location information to the location name that is included in the schedule information when the action of the user coincided with is sensed; and provide the POI information together with the location name included in the schedule information in an area corresponding to the location information when the map information is provided.

* * * * *